United States Patent [19]

Thompson et al.

[11] 4,147,689

[45] Apr. 3, 1979

[54] TRIFUNCTIONAL ANTIOXIDANT FOR POLYOLEFINS

[75] Inventors: John W. Thompson; Richard H. S. Wang, both of Kingsport, Tenn.

[73] Assignee: Eastman Kodak Company, Rochester, N.Y.

[21] Appl. No.: 851,925

[22] Filed: Nov. 16, 1977

Related U.S. Application Data

[63] Continuation of Ser. No. 709,679, Jul. 29, 1976, abandoned.

[51] Int. Cl.$^2$ .................. C08K 5/36; C07C 109/10
[52] U.S. Cl. .................. 260/45.9 NC; 260/559 H
[58] Field of Search ....... 260/561 H, 559 H, 45.9 NC

[56] References Cited

U.S. PATENT DOCUMENTS

| 3,549,572 | 12/1970 | Menagawa et al. | 260/559 H |
| 3,780,103 | 12/1973 | Knell | 260/45.9 NC |
| 3,894,990 | 7/1975 | Müller et al. | 260/45.9 NC |

Primary Examiner—V. P. Hoke
Attorney, Agent, or Firm—Donald W. Spurrell; Daniel B. Reece

[57] ABSTRACT

Bis(alkylhydroxyphenylacyl) 3,3'-thiadicarboxylic acid dihydrazides are useful thermal antioxidants for polyolefins, and provide in a single compound the primary antioxidant, secondary antioxidant and copper deactivator functions.

6 Claims, No Drawings

TRIFUNCTIONAL ANTIOXIDANT FOR POLYOLEFINS

This is a continuation of application Ser. No. 709,679 filed July 29, 1976 now abandoned.

This invention concerns novel stabilizers for polyolefins, particularly for applications where copper is present and where leaching of the stabilizer from the polymer is liable to occur.

Wire coating of polyolefins such as polypropylene, polyallomer, polyethylene, copolymers and mixtures thereof must be stabilized against thermal oxidation during processing and use. Generally, the stabilizer systems for wire coating formulations consist of a primary phenolic antioxidant such as 2,6-di(1-methylheptadecyl)-p-cresol (BMHPC), a secondary antioxidant such as dilauryl-3,3'-thiodipropionate (DLTDP), and a hydrazide-type copper deactivator such as N,N-dibenzal(oxalyldihydrazide) (OABH). For some wire coating applications, it is necessary that the stabilizers resist leaching from the polyolefin when it is in contact with such materials as petrolatum used as a filler in electrical cables; however, most commercial phenolic antioxidants, such as BMHPC and DLTDP, are readily leached from the polyolefin coating by materials such as petrolatum.

The present invention concerns a class of stabilizers which provide in a single compound the effectiveness of a primary phenolic antioxidant, a secondary antioxidant, and a hydrazide-type copper deactivator, and which is very resistant to extraction from polyolefins by petrolatum.

The compounds of this invention consist of a thiodicarbonyl, two hydrazo, and two ortho-alkylphenolic moieties as follows:

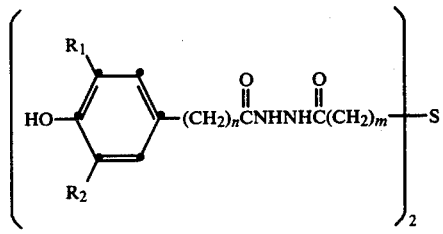

wherein $R_1$ is a straight or branched alkyl group of 1-8 carbons; $R_2$ is selected from hydrogen, alkyl of 1-6 carbons, and aryl of 6-10 carbons; n is 0, 1 or 2 and m is 1 or 2.

The following Table gives exemplary stabilizer compounds within the above general formula of the present invention:

| $R_1$ | $R_2$ | n | m |
|---|---|---|---|
| tert-$C_4H_9$ | tert-$C_4H_9$ | 0 | 1 |
| tert-$C_4H_9$ | tert-$C_4H_9$ | 0 | 2 |
| tert-$C_4H_9$ | tert-$C_4H_9$ | 1 | 1 |
| tert-$C_4H_9$ | tert-$C_4H_9$ | 1 | 2 |
| tert-$C_4H_9$ | tert-$C_4H_9$ | 2 | 1 |
| tert-$C_4H_9$ | tert-$C_4H_9$ | 2 | 2 |
| tert-$C_4H_9$ | H | 0 | 2 |
| tert-$C_4H_9$ | H | 2 | 2 |
| tert-$C_5H_{11}$ | tert-$C_5H_{11}$ | 2 | 2 |
| Sec-$C_3H_7$ | Sec-$C_3H_7$ | 2 | 2 |

The above compounds can be used as stabilizers in various polyolefins, including high and low density polyethylene, polypropylene, random and block copolymers of propylene and ethylene, polyallomer as disclosed in U.S. Pat. No. 3,529,037 incorporated herein by reference, and admixed polyolefins. They can be used as the sole stabilizer or in mixture with other stabilizers or other additives such as fillers and pigments if desired. Generally, a stabilizing concentration of 0.05 to 5.0%, preferably from 0.1 to 1.0%, by weight in the polyolefin will provide adequate stability, depending on the polyolefin and the intended application.

A general procedure which may be used to prepare the present stabilizers is as follows.

A solution containing the acid chloride of the appropriate hydroxyphenyl compound (0.02 mole), thiodialkanoyl hydrazide (0.01 mole), and a catalyst such as lithium chloride (1.0 g.) in 100 ml. of a solvent such as 1-methyl-2-pyrrolidinone is stirred at room temperature for several hours, e.g., 15 hours. The reaction mixture is poured into cold water and a solid precipitated. The solid is filtered, washed with hot toluene and recrystallized from ethanol.

EXAMPLE 1 - Preparation of Bis[3-(3,5-di-tert-butyl-4-hydroxyphenyl)propionyl]thiodipropionyldihydrazide

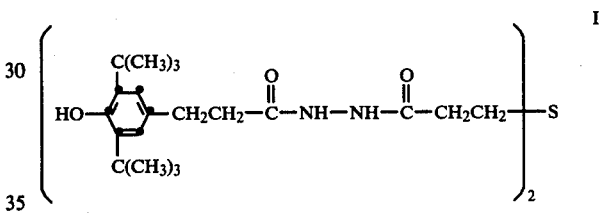

A solution containing 3-(3,5-di-tert-butyl-4-hydroxyphenyl) propionyl chloride (0.02 mole), thiodipropionyl hydrazide (0.01 mole), and lithium chloride (1.0 g) in 100 ml of 1-methyl-2-pyrrolidinone was stirred at room temperature for 15 hours. The reaction mixture was poured into cold water and a solid precipitated. The solid was filtered, washed with hot toluene and recrystallized from ethanol. The yield was 5.0 g melting at 230°–234° C.

EXAMPLE 2 - Preparation of Bis(2,5-di-tert-butyl-4-hydroxybenzoyl)thiodipropionyl dihydrazide)

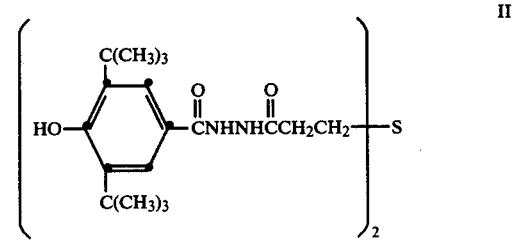

A solution containing 3,5-di-tert-butyl-4-hydroxybenzoic chloride (0.06 mole), thiodipropionyl hydrazide (0.03 mole), and lithium chloride (5.0 g.) in 100 ml. of 1-methyl-2-pyrrolidinone was stirred at room temperature for 15 hrs. The reaction mixture was poured into cold water and a solid precipitated. The solid was filtered, washed with hot toluene and recrystallized from ethanol. The yield was 6.0 g. melting at 271°–273° C.

EXAMPLE 3 - Differential Thermal Analysis Test of The Stabilizers

The utility of the present stabilizers in polyolefin wire coating is illustrated by the data in Table 1 below, where 10-mil films of the polyallomer of Example 1 of U.S. Pat. No. 3,529,037 were tested for oxidative stability by the Western Electric Company 200° C. Differential Thermal Analysis test. In this test a 5-mg film sample in a copper pan is exposed to oxygen at 200° C. in a Du Pont thermal analyzer with a DSC head. The stability of the film is measured as the time in minutes until the sample gives an oxidative exotherm. Film samples were tested initially as well as after aging in petrolatum containing 0.5% tetrakis[methylene(3,5-di-t-butyl-4-hydroxyhydrocinnamate)methane] (Irganox 1010) for 8 hours at 85° C. in a forced air oven, followed by removal from the petrolatum and then suspension in the same oven at the same temperature for 18 hours. This test measures stabilizer activity as an antioxidant and copper deactivator, as well as resistance to leaching by petrolatum.

Sample 1 in the table shows that 0.3% of the stabilizer of Example 1 (stabilizer I) with 0.3% BMHPC was superior to the sample 2 mixture of 0.3% BMHPC + 0.3% poly-1,4-cyclohexylenedimethylene-3,3'-thiodipropionate partially terminated with stearyl alcohol, molecular weight about 2,000 (Poly TDP-2000) + 0.1% copper deactivator OABH.

Table 1

| | Effectiveness of Stabilizers in Polyallomer | | |
|---|---|---|---|
| | | Oxidative Stability of 10-Mil Film | |
| Sample | Stabilizer | Initial | After Aging at 85° C. in Petrolatum and Oven |
| 1 | 0.3% BMHPC 0.3% Stabilizer I | 45 | 22 |
| 2 | 0.3% BMHPC 0.3% Poly TDP-2000 0.1 OABH | 16 | 9 |

EXAMPLE 4 - Oven Aging Test of the Stabilizers

The effectiveness of the stabilizers I and II as antioxidants and copper deactivators of low extractibility from Petrolatum is further illustrated by the data in Table 2 below. Sample 10-mil films of polyallomer containing stabilizers were aged in an oven with forced air at the temperatures indicated. The hours to embrittlement of the films were measured as the effectiveness of the stabilizers.

Table 2

| | Effectiveness of Stabilizers in Above Polyallomer | | | |
|---|---|---|---|---|
| | | Oven Life of 10 Mil Filler, Hour | | |
| | | Initial | | After Aging 240 Hr. at 70° C. In Petrolatum* |
| Sample | Stabilizer (With Polyallomer) | 160° C. | 140° C. | 160° C. | 140° C. |
| 1 | None | 5 | 130 | 15 | — |
| 2 | 0.5% I | 40 | 540 | 180 | 1480 |
| 3 | 0.5% II | 25 | 200 | 235 | 1500 |
| 4 | 0.1% Irganox 1010 | 250 | 1450 | 15 | 280 |
| 5 | 1.5% Cu-dust | <1 | <1 | — | — |
| 6 | 1.5% Cu-dust/0.5% I | 15 | 150 | — | — |
| 7 | 1.5% Cu-dust/0.5% II | 3 | 30 | — | — |

*Petrolatum contains 0.5% Irganox 1010

The invention has been described in detail with particular reference to certain preferred embodiments thereof, but it will be understood that variations and modifications can be effected within the spirit and scope of the invention.

We claim:

1. A stabilizer comprising a thiodicarboxyl, two hydrazo, and two ortho-alkylphenolic moieties as follows:

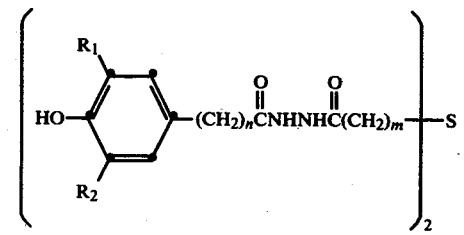

wherein $R_1$ is a straight or branched alkyl group of 1-8 carbons; $R_2$ is selected from hydrogen, alkyl of 1-6 carbons, and aryl of 6-10 carbons; n is 0, 1 or 2; and m is 1 or 2.

2. The stabilizer of claim 1 having the formula

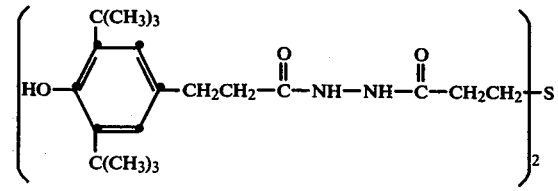

3. The stabilizer of claim 1 having the formula

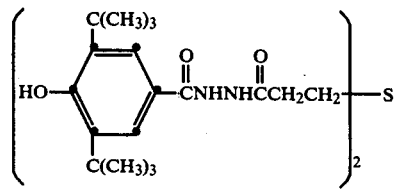

4. Polyolefin material containing a stabilizing amount of the stabilizer of claim 1.

5. Polyolefin material containing from about 0.01 to about 5.0% by weight of the stabilizer of claim 2.

6. Polyolefin material containing from about 0.01 to about 5.0% by weight of the stabilizer of claim 3.

* * * * *